United States Patent
Lindsey (10) Patent No.: US 12,164,349 B2
(45) Date of Patent: *Dec. 10, 2024

(54) POWER RESET, AND ASSOCIATED CIRCUITRY, DEVICES, SYSTEMS, MOBILE UNITS, AND METHODS

(71) Applicant: LiveView Technologies, LLC, Orem, UT (US)

(72) Inventor: Richard C. Lindsey, Payson, UT (US)

(73) Assignee: LiveView Technologies, Inc., American Fork, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/297,128

(22) Filed: Apr. 7, 2023

(65) Prior Publication Data

US 2024/0160262 A1 May 16, 2024

Related U.S. Application Data

(63) Continuation of application No. 18/054,591, filed on Nov. 11, 2022, now Pat. No. 11,662,788.

(51) Int. Cl.
| | | |
|---|---|---|
| *G06F 1/24* | (2006.01) | |
| *G06F 1/06* | (2006.01) | |
| *G06F 1/26* | (2006.01) | |
| *G06F 1/28* | (2006.01) | |

(52) U.S. Cl.
CPC ............. *G06F 1/24* (2013.01); *G06F 1/06* (2013.01); *G06F 1/263* (2013.01); *G06F 1/28* (2013.01)

(58) Field of Classification Search
CPC ... G06F 1/24; G06F 1/06; G06F 1/263; G06F 1/28
See application file for complete search history.

(56) References Cited

U.S. PATENT DOCUMENTS

| | | | |
|---|---|---|---|
| 5,086,453 A | 2/1992 | Senoo et al. | |
| 7,774,633 B1* | 8/2010 | Harrenstien | G06F 11/0793 |
| | | | 713/323 |
| 9,746,893 B1 | 8/2017 | Sizikov et al. | |
| 9,997,957 B2 | 6/2018 | Chapel et al. | |
| 2004/0136388 A1 | 7/2004 | Schaff | |
| 2005/0132237 A1 | 6/2005 | Barsuk | |
| 2006/0259933 A1 | 11/2006 | Fishel et al. | |
| 2009/0013210 A1* | 1/2009 | McIntosh | H04L 43/10 |
| | | | 714/E11.113 |
| 2011/0320830 A1* | 12/2011 | Ito | H02J 9/002 |
| | | | 713/300 |
| 2012/0278601 A1* | 11/2012 | Chang | G06F 1/3203 |
| | | | 713/300 |

(Continued)

*Primary Examiner* — Aurel Prifti
(74) *Attorney, Agent, or Firm* — TraskBritt (57) ABSTRACT

Various embodiments relate to power reset. A system may include a power source and a load configured to couple to the power source. The system may also include a modem configured to receive a first signal from a remote device and generate a second signal responsive to receipt of the first signal. Further, the system may include circuitry. The circuitry may be configured to responsive to the second signal, disconnect the load from the power source for a time duration. The circuitry may further be configured to reconnect the load to the power source after the time duration. Associated methods and mobile units are also disclosed.

18 Claims, 6 Drawing Sheets

(56) References Cited

U.S. PATENT DOCUMENTS

| | | |
|---|---|---|
| 2013/0185547 A1* | 7/2013 | Sturdivant ................ G06F 1/24 713/1 |
| 2015/0067312 A1* | 3/2015 | Lewandowski ..... G06F 11/0793 713/300 |
| 2016/0026192 A1 | 1/2016 | Phillips et al. |
| 2016/0164831 A1* | 6/2016 | Kim ........................ H04L 67/56 709/223 |
| 2016/0181936 A1* | 6/2016 | Ailenei ................ H02J 3/0073 363/148 |
| 2016/0232764 A1 | 8/2016 | Galvin et al. |
| 2016/0358435 A1 | 12/2016 | Lee |
| 2018/0074562 A1* | 3/2018 | Lampe ................... H04N 23/65 |
| 2018/0159345 A1* | 6/2018 | Lin .......................... H02J 7/00 |
| 2018/0348848 A1 | 12/2018 | Bower et al. |
| 2019/0042418 A1* | 2/2019 | Dutta .................. G06F 12/0868 |
| 2019/0078347 A1 | 3/2019 | Gharabegian |
| 2020/0033932 A1 | 1/2020 | Sachs et al. |
| 2021/0037041 A1 | 2/2021 | Ree |
| 2021/0151270 A1* | 5/2021 | King ....................... H01H 47/22 |
| 2021/0368142 A1* | 11/2021 | Phillips ................ H04N 23/661 |
| 2022/0334846 A1* | 10/2022 | Doi .......................... G06F 1/26 |
| 2023/0318327 A1* | 10/2023 | Tong ....................... G06F 3/038 345/179 |

* cited by examiner

POWER RESET, AND ASSOCIATED CIRCUITRY, DEVICES, SYSTEMS, MOBILE UNITS, AND METHODS

CROSS-REFERENCE TO RELATED APPLICATION

This application is a continuation of U.S. patent application Ser. No. 18/054,591, filed Nov. 11, 2022, now U.S. Pat. No. 11,662,788, issued May 30, 2023, the disclosure of which is hereby incorporated herein in its entirety by this reference.

TECHNICAL FIELD

This disclosure relates generally to power reset and, more specifically, to resetting a remote device, and to related circuitry, devices, systems, mobile units, and methods.

BACKGROUND

An electronic device, such as a computer, may need to be rebooted via a reset/reboot button or by disconnecting and reconnecting ("toggling") power to the electronic device.

BRIEF SUMMARY

At least one embodiment of the disclosure includes a system including a mobile security unit. The mobile security unit may include a power source and a load configured to couple to the power source. The mobile security unit may also include a modem configured to receive a first signal from a remote device and generate a second signal responsive to receipt of the first signal. Further, the mobile security unit may include circuitry. The circuitry may be configured to be responsive to the second signal, disconnect the load from the power source for a time duration. The circuitry may further be configured to reconnect the load to the power source after the time duration.

Another embodiment includes a method of rebooting a load of a mobile security unit. The method may include generating a pulse signal via a modem of a mobile security unit. The method may also include responsive to the pulse signal, disconnecting, via circuitry including at least one switch, a load of the mobile security unit from at least one battery of the mobile security unit. Further, the method may include reconnecting, via the circuitry, the load to the at least one battery after a predetermined time period.

Other embodiments may include a mobile surveillance unit. The mobile surveillance unit may include at least one power source and a load configured to couple to the at least one power source. The mobile surveillance unit may also include a communication device configured to generate a pulse signal. Further, the mobile surveillance unit may include circuitry including at least one relay, wherein the circuitry is configured to, responsive to receipt of the pulse signal, disconnect the load from the at least one power source via the at least one relay.

DETAILED DESCRIPTION

Referring in general to the accompanying drawings, various embodiments of the present disclosure are illustrated to show example embodiments related to power reset. It should be understood that the drawings presented are not meant to be illustrative of actual views of any particular portion of an actual circuit, device, system, or structure, but are merely representations which are employed to more clearly depict various embodiments of the disclosure.

The following provides a more detailed description of the present disclosure and various representative embodiments thereof. In this description, functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

As will be appreciated, an electronic device may occasionally stop working (e.g., "freeze" or "hang") and may need to be rebooted by disconnecting and reconnecting (also referred to herein as "toggling") power to the electronic device. Further, in some cases, an electronic device may include a watchdog timer that monitors a clock signal, and if the clock signal is missing for a predetermined period of time, a reset pulse may be sent to a reset input to reset the electronic device. However, in some cases wherein a watchdog timer stops working (e.g., hangs or freezes), an electronic device may need to be reset by toggling power to the electronic device.

As will also be appreciated, in some systems, an electronic device may be remote from other devices (e.g., server and/or a user device) of the system. As a more specific, non-limiting example, a remote unit (e.g., a "mobile unit" or "remote device"), which may include one or more input devices (e.g., sensors, cameras, etc.), one or more output devices (e.g., lights, speakers, etc.), a communication device, a storage device, and/or a controller may be positioned at a first location, and a server and/or one user devices may be positioned at another location, which is remote from the first location.

In some conventional systems, when a device (e.g., a controller) of a remote unit (e.g., a mobile, remote unit) fails, a technician is dispatched from a location nearest to, but remote from, that of the remote unit. The technician, after traveling to (e.g., via a vehicle) and arriving at the location of the remote unit, manually disconnects power to the device. After a few seconds, the technician powers the device back on to reset the device. This is not only expensive but may take several days before the remote unit can be reached and the device is restored to full operation. As will be appreciated, downtime of a remote unit is very costly (e.g., to a business due to clients/customers not paying for associated products/services during downtime).

Various embodiments of the disclosure relate to resetting a remote device. More specifically, various embodiments relate to momentarily disconnecting power to a remote device and reconnecting power to the remote to reset the remote device. In some embodiments, the power to the remote device may be disconnected and reconnected responsive to a signal generated via a communication device of the remote device. In some embodiments the signal may be generated in response to another signal received from a remote device (e.g., a server or a user device). It is noted that according to implementation and/or configuration of an associated system, the remote device may or may not be automatically reconnected to power.

According to various embodiments, circuitry, which may be relatively small, inexpensive, and/or simple, may be configured to disconnect a main power source as well as a backup power source (e.g., simultaneously and momentarily), which may toggle the power and allow the device (and any other associated devices, including the communications device) to reset itself, thereby eliminating the need for a technician to be dispatched to the remote location to manually perform a reset operation.

As will be appreciated, after detecting that a remote device is malfunctioning and/or has stopped working, various embodiments disclosed herein may allow for the remote device to be restored (e.g., to full operation) (i.e., via remote control) in a relatively short time period (e.g., within a few seconds or minutes).

Embodiments of the disclosure will now be explained with reference to the accompanying drawings.

Figure 1:
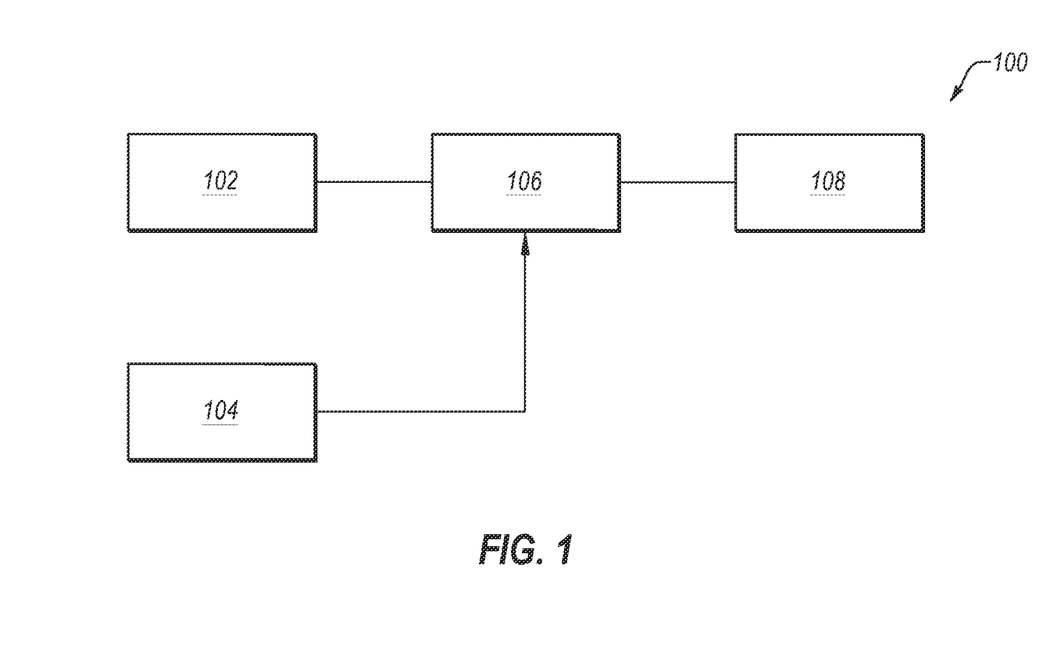
FIG. 1 depicts an example system, according to various embodiments of the disclosure.

FIG. 1 illustrates an example system 100, in accordance with various embodiments of the disclosure. System 100 includes a power source 102, a communication device 104, circuitry 106, and a load 108. For example, power source 102 may include one or more power sources, such as a primary power source (e.g., one or more primary batteries) and a secondary power source (e.g., one or more backup batteries). Further, for example, load 108 may include a controller (also referred to herein as a "control unit" or a "control board") and/or one or more other devices (e.g., a communication device (e.g., communication device 104), one or more sensors (e.g., camera(s), sound detector(s), etc.), one or more output devices (e.g., light(s), speaker(s), etc.), without limitation). Further, for example, communication device 104 may include a modem. Moreover, for example, circuitry 106 may include one or more components (e.g., one or more relays, switches, and/or transistors) for disconnecting load 108 from power source 102 (e.g., responsive to an event).

According to some embodiments in which load 108 includes a controller, load 108 may monitor various functions of system 100 and report back to, for example, a server (e.g., a cloud server) (not shown in FIG. 1) or a remote device (not shown in FIG. 1) via communication device 104. The odds that both load 108 and communication device 104 malfunction and/or stop working at the same time may be very small. In some cases, communication device 104 may be more reliable than load 108, thus in some scenarios, although load 108 may be malfunctioning, communication device 104 may be functioning properly.

In some examples, in the event load 108 stops working (also referred to herein as "malfunctions" or some variation thereof) (e.g., hangs, freezes, fails to respond, etc.), a signal may be sent from communication device 104 to circuitry 106, and, in response thereto, circuitry 106 may disconnect (e.g., temporarily disconnect) load 108 from power source 102 and reconnect (e.g., automatically after expiration of a time period) power source 102 to load 108 such that load 108 resets. More specifically, during one contemplated operation of system 100, in response to determining that load 108 is not operating properly (e.g., load 108 has frozen and/or is malfunctioning, etc.), communication device 104 may send a signal (e.g., a pulse signal, such as a high pulse or a low pulse) to circuitry 106 to cause one or more switches of circuitry 106 to temporarily open and, as a result, temporarily electrically decouple load 108 from power source 102. In some embodiments, after a time period (e.g., a short time period, such as two seconds or less), the one or more switches of circuitry 106 may close and, as a result, load 108 may again electrically couple to power source 102, thus causing load 108 to reset.

According to some embodiments, communication device 104 may send the signal (i.e., the signal to temporarily disconnect power to load 108) responsive to an event. For example, an event may include receipt of a signal, which may have originated internally (i.e., within system 100) or from another device (e.g., a remote server (e.g., a cloud server) or a remote user device). As another example, an event may include detecting that load 108 has stopped functioning properly (e.g., via a remote device (e.g., a server, a user device, without limitation) and/or via a local device (i.e., local to system 100)).

In some embodiments system 100 may further include a control device (e.g., a CPU, a controller, a watchdog circuit (e.g., a watchdog timer), without limitation) configured to send a signal (e.g., a pulse signal, such as a high pulse or a low pulse) to circuitry 106 to cause one or more switches of circuitry 106 to temporarily open and, as a result, temporarily electrically decouple load 108 from power source 102. In some embodiments, communication device 104 may include the control device and a modem (e.g., the control device may be separate from a modem). In other embodiments, the control device may be separate from communication device 104. In these embodiments, communication device 104 may or may not be configured to send a signal (e.g., a pulse signal) to circuitry 106 (e.g., to cause one or more switches of circuitry 106 to temporarily open).

According to some embodiments, a reset device (also referred to herein as a "reset module"), which may be coupled between a load (e.g., a controller) and one or more power sources (e.g., a primary battery and/or backup battery), may be configured to disconnect the load from the one or more power sources. In one example, in response to a signal from a communication device, the reset device may disconnect the load from the one or more power sources. As a more specific example, in response to a control signal from a modem, one-shot circuitry of a reset device may be triggered to momentarily open a number of "normally closed" (N.C.) relay contacts and disconnect all power going to a controller of the load. Further, in at least some embodiments, the controller may provide power to the modem, and thus upon the controller being temporarily disconnected from the one or more power sources, the modem may also be temporarily disconnected from the one or more power sources.

Figure 2:
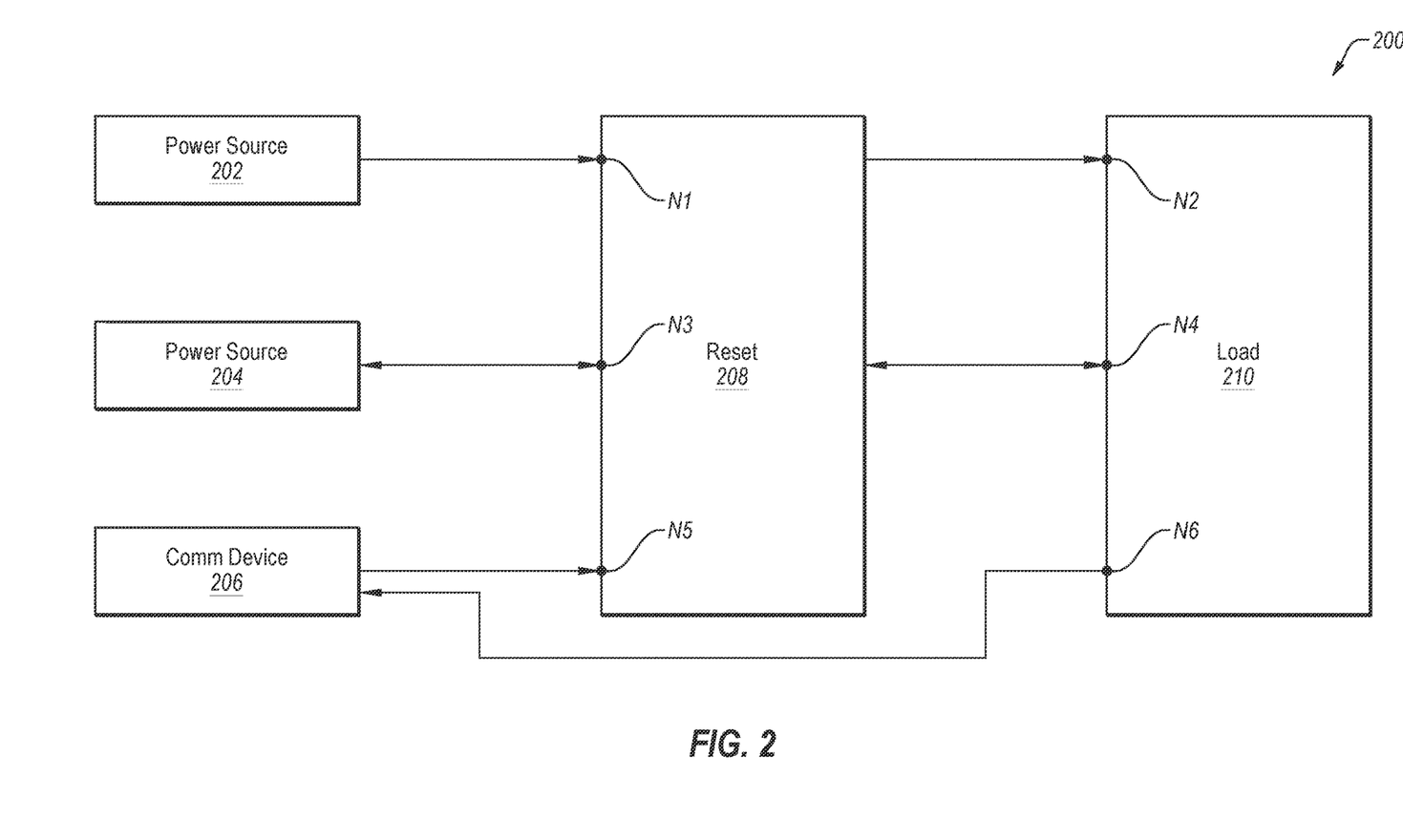
FIG. 2 illustrates another example system, according to various embodiments of the disclosure.

FIG. 2 illustrates an example system 200, according to various embodiments of the disclosure. System 200 includes a power source 202, a power source 204, a communication device 206, a reset module 208, and a load 210. In one example, power source 202 may include a primary power source (e.g., one or more primary batteries), power source 204 may include a backup power source (e.g., one or more backup batteries), communication device 206 may include a modem (e.g., an enterprise-grade modem (e.g., a Cradlepoint modem) or any other suitable modem), and load 210 may include a controller.

According to one non-limiting example, reset module 208 may receive primary power from power source 202 via a node N1, and load 210 may receive the primary power (e.g., 24 volts) from reset module 208 via a node N2. Further, reset module 208 may receive backup power from power source 204 via a node N3, and load 210 may receive the backup power (e.g., via a bus, such as a 24-volt bus) from reset module 208 via a node N4. In some embodiments, node N4 may also be configured to couple to a ground voltage (e.g., via a relay). Moreover, reset module 208 may receive a signal from communication device 206 via a node N5, and load 210 may convey power (e.g., 24 volts or any other suitable voltage), via a node N6, to communication device 206.

According to various embodiments, responsive to an event, reset module 208 may be configured to disconnect load 210 from each of power source 202 and power source 204. More specifically, according to various embodiments, responsive to an event, communication device 206 may convey a signal (e.g., a pulse signal or any other type of signal) to reset module 208, which, in response to receipt of the signal from communication device 206, may be configured to disconnect load 210 from each of power source 202 and power source 204.

Figure 3:
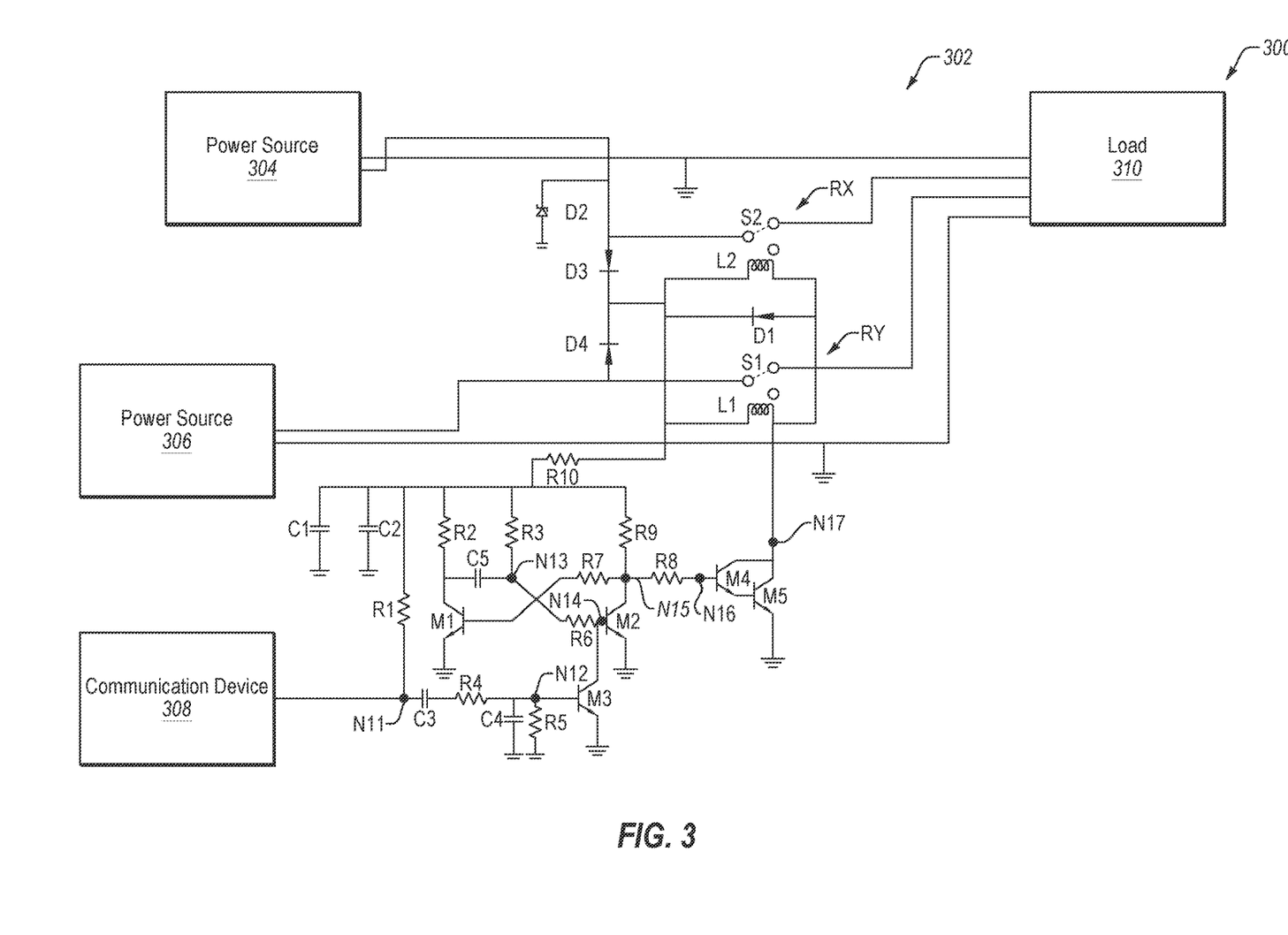
FIG. 3 illustrates yet another example system including circuitry, in accordance with various embodiments of the disclosure.

FIG. 3 illustrates an example system 300 including circuitry 302, in accordance with various embodiments of the disclosure. For example, circuitry 106 of FIG. 1 and/or reset module 208 of FIG. 2 may include circuitry 302 of FIG. 3. System 300 further includes a power source 304, a power source 306, a communication device 308, and a load 310. In one example, power source 304 includes a primary power source and power source 306 includes a secondary power source. For example, power source 304 may include one or more primary batteries (e.g., one or more chargeable batteries) and power source 306 may include one or more backup batteries (e.g., one or more chargeable batteries).

Circuitry 302, which in this example is coupled between power source 304, power source 306, communication device 308, and load 310, includes a number of capacitors C1-C5, a number of resistors R1-R10, and a number of transistors M1-M5. It is noted that transistors M1 and M2 may form and/or may collectively be referred to herein as a "one-shot" circuit. Circuitry 302 further includes diodes D1-D4, a relay RY, which includes an inductor (e.g., a coil) L1 and a switch S1, and a relay RX, which includes an inductor (e.g., a coil) L2 and a switch S2. In one example, each of relay RY and relay RX may include and/or be configured as a normally closed (N.C.) relay.

As shown in circuitry 302, a node N11 is positioned between an output of communication device 308 and a capacitor C3, a node N12 is positioned between a transistor M3 and a resistor R5, a node N13 is positioned between a resistor R3 and a capacitor C5, and a node N14 is positioned between a resistor R6 and a transistor M2. As also shown in circuitry 302, a node N15 is coupled to one end of a resistor R8 (i.e., between a resistor R7 and resistor R8), a node N16 is coupled to another end of resistor R8 (i.e., between resistor R8 and a transistor M4), and a node N17 is coupled between an inductor L1 and a transistor M5 (e.g., node N17 is coupled to a collector of transistor M5). Switch S1 is coupled between power source 306 and load 310, and switch S2 is coupled between power source 304 and load 310.

With reference to FIG. 3, a contemplated operation of system 300 will now be described. In this contemplated operation, load 310, which may be part of a unit (e.g., a mobile unit) positioned in a remote location (e.g., a parking lot, a roadside location, a construction zone, a concert venue, a sporting venue, a school campus, without limitation), includes a controller that is not operating properly (e.g., load 310 has frozen).

After detecting that load 310 is not operating properly, communication device 308, which may include a modem, may output a signal, such as a pulse signal. More specifically, for example, an output of communication device 308 (i.e., a signal at node N11), which may be HIGH initially (i.e., in a normal state), may transition LOW for a time period (e.g., a predetermined time period, such as 1 second, 1.5 seconds, 1.8 seconds, 2 seconds, 2.5 seconds, or any other suitable time period), and thereafter the output of communication device 308 (i.e., a signal at node N11) may return to a HIGH state. Responsive to the signal at node N11 transitioning from HIGH to LOW and back to HIGH, a signal at node N12 may include an upward spike that turns transistor M3 ON momentarily causing node N13 and node N14 to transition LOW (i.e., node N13 and node N14 are momentarily coupled to ground), thus causing a signal at node N13 and at node N14 to include a downward spike. Further, responsive to the signal (i.e., the signal generated by communication device 308), a signal at node N15, which is LOW in the normal state, goes HIGH, thus causing node N16 to momentarily transition HIGH, which turns ON the Darlington transistor configuration (i.e., including transistors M4 and M5).

Responsive to transistors M4 and M5 being ON (i.e., in a conductive state), a node N17 is coupled to ground and current may flow through inductors L1 and L2 to momentarily open switches S1 and S2, and thus momentarily disconnect (e.g., substantially simultaneously disconnect) load 310 from both power source 304 and power source 306. As will be appreciated, this described operation may allow load 310 and any other associated devices (i.e., devices coupled to load 310), including communication device 308 to be reset (also known as "reboot"). Accordingly, in this described example operation, load 310 may be reset responsive to a signal generated via communication device 308 and it is not required for a technician to be dispatched to a location (e.g., a remote location) of load 310 to manually reset (reboot) load 310.

As will be appreciated, various components of circuitry 302 may affect timing, filtering, and/or noise immunity of circuitry 302. More specifically, capacitors C1 and C2 may provide filtering, resistor R10 may provide noise immunity, and capacitor C5 and resistors R2 and R3 may affect timing of circuitry 302. Accordingly, as will be appreciated, various component values of circuitry 302 may be varied depending on various factors, such as timing, noise, application, configuration, and/or other factors. In one non-limiting example, values of one or more components of circuitry 302 (e.g., values of capacitor C5 and resistors R2 and R3) may be selected such that load 310 is decoupled from primary power source 304 and secondary power source 306 (i.e., prior to being recoupled) for approximately 1.8 seconds, long enough to ensure that power is completely removed from load 310 to cause load 310, and possibly communication device 308, to reboot upon being reconnected to power.

In one specific, non-limiting example, capacitor C1 may have a capacitance of approximately 4.7 microfarads (µF), capacitor C2 may have a capacitance of approximately 0.01 µF, capacitor C3 may have a capacitance of approximately 2.2 µF, capacitor C4 may have a capacitance of approximately 0.01 µF, and capacitor C5 may have a capacitance of approximately 10 µF. Continuing with this non-limiting example, resistor R1 may have a resistance of approximately 33 kiloohms (kΩ), resistor R2 may have a resistance of approximately 100 kΩ, resistor R3 may have a resistance of approximately 1 megaohm (MΩ), resistor R4 may have a resistance of approximately 100 kΩ, resistor R5 may have a resistance of approximately 100 kΩ, resistor R6 may have a resistance of approximately of 1 MΩ, resistor R7 may have a resistance of approximately of 1 MΩ, resistor R8 may have a resistance of approximately of 510 kΩ, resistor R9 may have a resistance of approximately 100 kΩ, and resistor R10 may have a resistance of approximately 1 kΩ. As will be appreciated, depending on various factors of an associated system and/or circuitry, component values may be varied to carry out various embodiments of the disclosure.

It is noted that circuitry 302 is provided as example circuitry to decouple and couple (e.g., recouple) a load from one or more power sources, however the disclosure is not so limited and any suitable circuitry for decoupling and coupling load from one or more power sources may be within the scope of the disclosure. For example, a reset module (e.g., reset module 208 of FIG. 2) may include any suitable circuitry for decoupling and coupling a load from one or more power sources.

As noted above with reference to system 100 of FIG. 1, in some embodiments, a system may further include a control device (e.g., a CPU, a controller, a watchdog circuit (e.g., a watchdog timer)) (e.g., within communication device 104 or external to communication device 104) configured to send a signal (e.g., a pulse signal, such as a high pulse or a low pulse) to circuitry to cause one or more switches of the circuitry to temporarily open and, as a result, temporarily electrically decouple a load from a power source. In embodiments wherein the control device is separate from a communication device (e.g., including a modem), the communication device may or may not be configured to send a signal (e.g., a pulse signal, such as a high pulse or a low pulse) to the circuitry to reset an associated load (e.g., controller).

Figure 4:
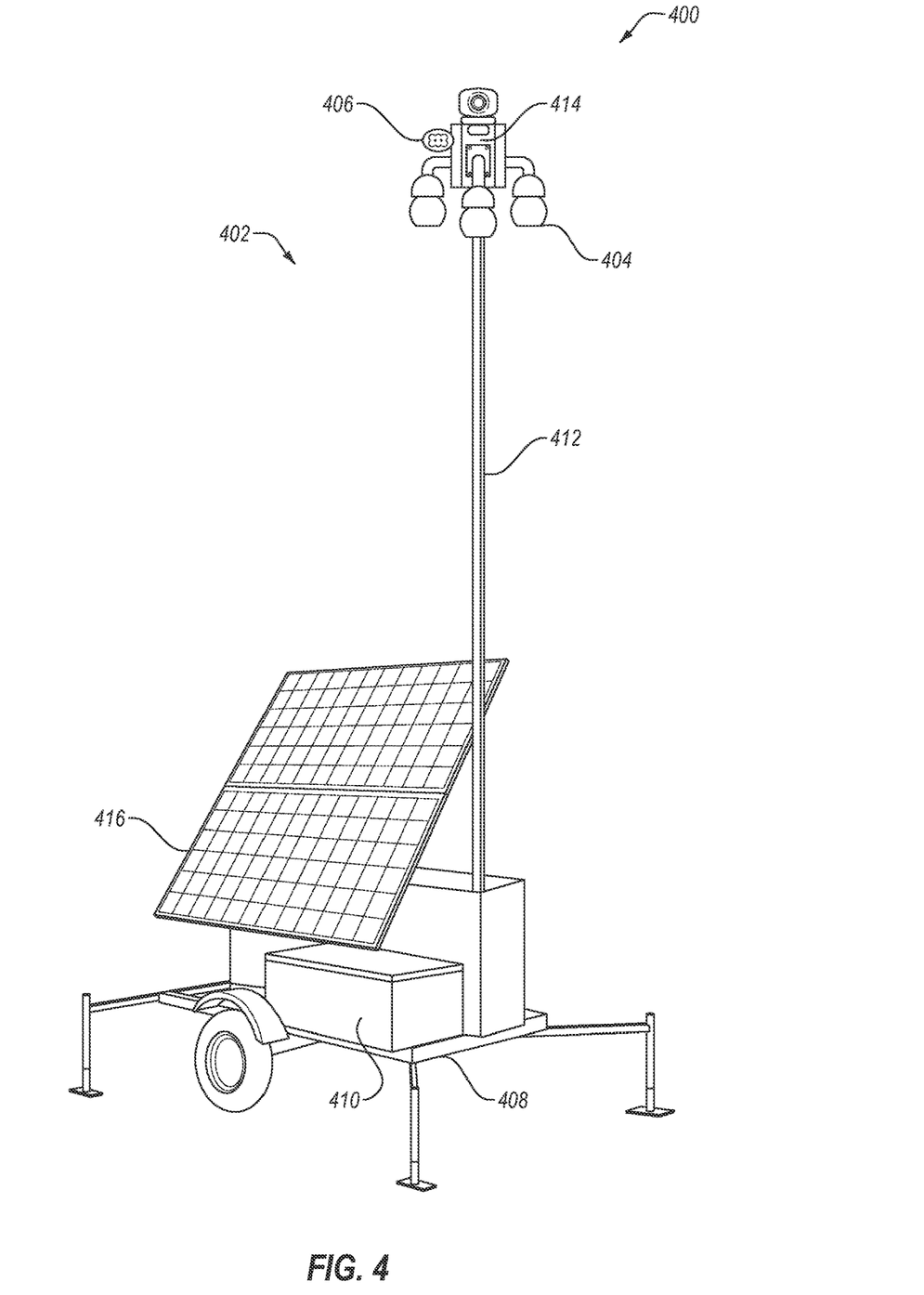
FIG. 4 depicts an example system including a mobile unit, in accordance with various embodiments of the disclosure.

FIG. 4 depicts another example system 400 including a unit 402, in accordance with various embodiments of the disclosure. Unit 402, which may also be referred to herein as a "mobile unit," a "mobile security unit," a "live unit," or a "physical unit," may be configured to be positioned in an environment (e.g., a parking lot, a roadside location, a construction zone, a concert venue, a sporting venue, a school campus, without limitation). In some embodiments, unit 402 may include one or more sensors (e.g., cameras, weather sensors, motion sensors, noise sensors, without limitation) 404 and one or more output devices 406 (e.g., lights, speakers, electronic displays, without limitation). Unit 402 may also include at least one storage device (e.g., internal flash media, a network attached storage device, or any other suitable electronic storage device), which may be configured for receiving and storing data (e.g., video, images, audio, without limitation) captured by one or more sensors of unit 402. According to some embodiments, unit 402 may include system 100 of FIG. 1, system 200 of FIG. 2, and/or system 300 of FIG. 3.

In some embodiments, unit 402 may include a mobile security unit. In these and other embodiments, unit 402 may include a portable trailer 408, a storage box 410, and a mast 412 coupled to a head unit 414 which may include for example, one or more batteries, one or more cameras, one or more lights, one or more speakers, and/or one or more microphones. According to some embodiments, a first end of mast 412 may be proximate storage box 410 and a second, opposite end of mast 412 may be proximate, and possibly adjacent, head unit 414. More specifically, in some embodiments, head unit 414 may be coupled to mast 412 an end opposite an end of mast 412 proximate storage box 410.

In some examples, unit 402 may include one or more primary batteries (e.g., within storage box 410) and one or more secondary batteries (e.g., within head unit 414). In these embodiments, a primary battery positioned in storage box 410 may be coupled to a load and/or a secondary battery positioned within head unit 414 via, for example, a cord reel.

In some embodiments, unit 402 may also include one or more solar panels 416, which may provide power to one or more batteries of unit 402. More specifically, according to some embodiments, one or more solar panels 416 may provide power to a primary battery within storage box 410. Although not illustrated in FIG. 4, unit 402 may also include one or more additional power sources, such as one or more generators (e.g., fuel cell generators).

Figure 5:
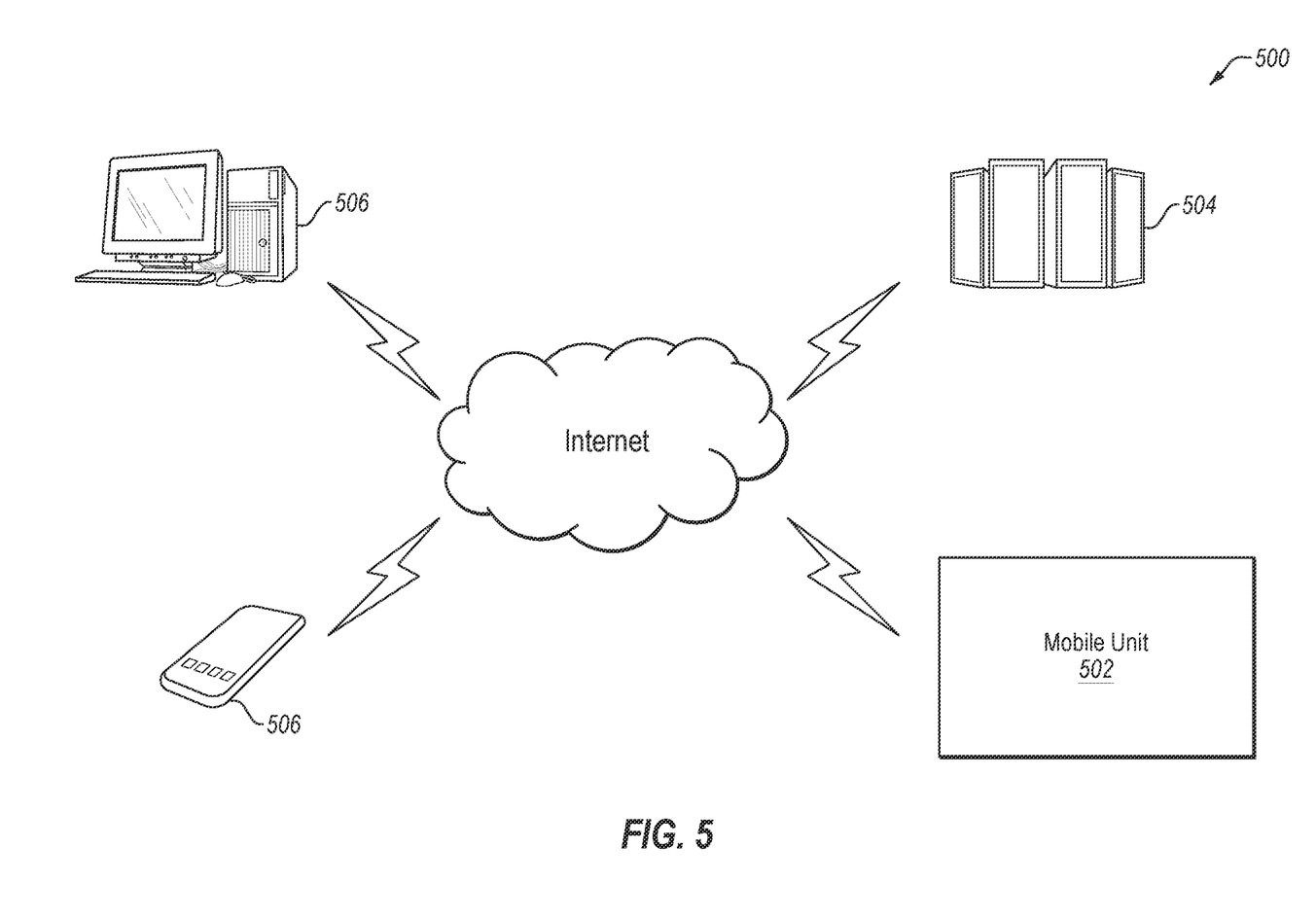
FIG. 5 depicts an example system including a mobile unit, a server, and one or more devices, in accordance with various embodiments of the disclosure.

FIG. 5 depicts a system 500, in accordance with various embodiments of the disclosure. System 500 includes a mobile unit 502, a server 504, and one or more devices 506. In one non-limiting example, mobile unit 502 includes mobile unit 402 (see FIG. 4), server 504 may include a cloud server or any other server, and device(s) 506 may include an electronic device, such as a user device (e.g., mobile phone, tablet, etc.), a desktop computer, or any other suitable electronic device (e.g., including a display). According to various embodiments, each of server 504 and device(s) 506 may be remote from mobile unit 502.

According to various embodiments of the present disclosure, mobile unit 502, which includes a modem (e.g., communication device 104/206/308), may be within a first location (a "camera location" or a "remote location"), and server 504 may be within a second location, remote from the camera location. In addition, in at least some examples, electronic device 506 may be remote from the camera location and/or server 504. As will be appreciated by a person having ordinary skill in the art, system 200 is modular, expandable, and scalable.

Figure 6:
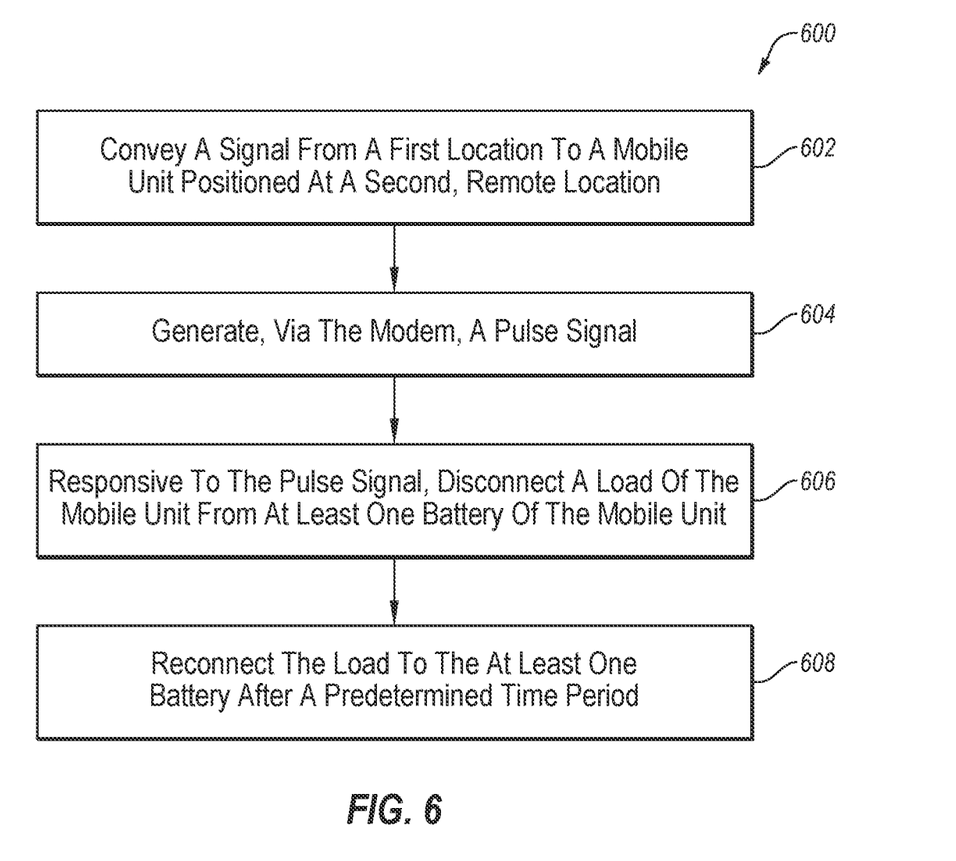
FIG. 6 is a flowchart illustrating an example method of rebooting a controller of a mobile unit, according to various embodiments of the disclosure.

FIG. 6 is a flowchart of an example method 600 of rebooting a load of a mobile unit. Method 600 may be arranged in accordance with at least one embodiment described in the disclosure. Method 600 may be performed, in some embodiments, by a device or system, such as system 100 (see FIG. 1), system 200 (see FIG. 2), system 300 (see FIG. 3), unit 402 (see FIG. 4), system 500 (see FIG. 5), or another device or system. Although illustrated as discrete blocks, various blocks may be divided into additional blocks, combined into fewer blocks, or eliminated, depending on the desired implementation.

Method 600 may begin at block 602, wherein a signal is conveyed from a first location to a modem of a mobile unit positioned at a second location that is remote from the first location, and method 600 may proceed to block 604. For example, a signal may be conveyed from a server (e.g., a cloud server), a user device, or any other device. As a more specific example, the signal may be conveyed from a server to the modem, which may be part of a mobile unit (e.g., unit 402 of FIG. 4) that is remote from the server.

At block 604, a control signal is generated at the modem, and method 600 may proceed to block 606. For example, the control signal may include a pulse signal generated by the modem responsive to receipt of the signal conveyed to the modem (e.g., from a remote server or a remote user device). For example, the modem, which may include a default output in a HIGH state, may generate a downward ("low") pulse (e.g., transitioning from HIGH to LOW and back to HIGH). As a more specific example, the modem, which may be part of a mobile unit (e.g., unit 402 of FIG. 4), may generate the pulse signal. In other embodiments, the control signal may include an upward ("high") pulse (e.g., transitioning from LOW to HIGH and back to LOW).

At block 606, responsive to the control signal, a load of the mobile unit is disconnected from at least one battery of the mobile unit, and method 600 may proceed to block 608. For example, the load may include a controller. Further, for example, the load may be disconnected from a first power source (e.g., one or more primary batteries) and possibly a second power source (e.g., one or more backup batteries) of the mobile unit. As a more specific example, the control signal may be received at a reset module (e.g., module 208 of FIG. 2), which may be part of the mobile unit (e.g., unit 402 of FIG. 4) and may include circuitry (e.g., circuitry 302 of FIG. 3) that may be configured for disconnecting the load from at least one battery (e.g., primary power source 304 and secondary power source 306 of FIG. 3) of the mobile unit.

At block 608, the load may reconnect to the at least one battery. For example, the load may automatically reconnect to the at least one battery after expiration of a time period (e.g., 1 second, 1.5 seconds, 1.8 seconds, 2 seconds, without limitation), which may be predetermined based on one or more circuit values of associated circuitry (e.g., circuitry 302 of FIG. 3).

Modifications, additions, or omissions may be made to method 600 without departing from the scope of the present disclosure. For example, the operations of method 600 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

As will be appreciated by persons having ordinary skill in the art, in contrast to conventional systems, devices, circuitry, and methods, which require a user to travel to a remote location of a mobile unit to manually reset a controller of the mobile unit, various embodiments may enable a user to remotely reset a device (e.g., a controller of a mobile unit). Thus, as will be appreciated by a person having ordinary skill in the art, various embodiments may save time and may reduce costs associated with the mobile unit. Further, various embodiments may increase uptime of a remote unit.

In accordance with common practice, the various features illustrated in the drawings may not be drawn to scale. The illustrations presented in the disclosure are not meant to be actual views of any particular apparatus (e.g., circuit, device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., circuit, device, or system) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. As used herein, "and/or" includes any and all combinations of one or more of the associated listed items.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

As used herein, the term "approximately" or the term "substantially" in reference to a given parameter, property, or condition means and includes to a degree that one of ordinary skill in the art would understand that the given parameter, property, or condition is met with a degree of variance, such as within acceptable tolerances. By way of example, depending on the particular parameter, property, or condition that is substantially met, the parameter, property, or condition may be at least 90.0 percent met, at least 95.0 percent met, at least 99.0 percent met, at least 99.9 percent met, or even 100.0 percent met.

As used herein, the term "approximately" or the term "about," when used in reference to a numerical value for a particular parameter, is inclusive of the numerical value and a degree of variance from the numerical value that one of ordinary skill in the art would understand is within acceptable tolerances for the particular parameter. For example, "about," in reference to a numerical value, may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternative useful combinations of the elements described, will become apparent to those skilled in the art from the description. Such modifications and embodiments also fall within the scope of the appended claims and equivalents.

What is claimed:

1. A system including a mobile security unit, comprising:
   a power source;
   a load comprising a controller configured to couple to the power source;
   a modem configured to receive a first signal from a remote device and generate a second signal responsive to receipt of the first signal, wherein the controller is configured to couple and provide power to the modem; and
   circuitry configured to:
     responsive to the second signal, disconnect the controller from the power source for a time duration; and
     reconnect the controller to the power source after the time duration; wherein the circuitry includes:
       at least one relay coupled between the power source and the controller; and
       at least one transistor coupled between the modem and the at least one relay.

2. The system of claim 1, wherein the power source comprises one or more primary batteries and one or more secondary batteries.

3. The system of claim 1, wherein the time duration is approximately two seconds or less.

4. The system of claim 1, wherein the modem is configured to generate a third signal in a first state in normal operation, wherein the second signal comprises a pulse signal having a second, different state.

5. The system of claim 1, wherein the second signal comprises a pulse signal.

6. The system of claim 1, wherein the circuitry includes a number of transistors coupled between the modem and the controller.

7. The system of claim 1, further comprising the remote device configured to convey the first signal to the modem.

8. A method of rebooting a load of a mobile security unit, the method comprising:
   generating a pulse signal via a modem of a mobile security unit;
   responsive to the pulse signal, disconnecting, via circuitry including at least one switch, a load comprising a controller of the mobile security unit from at least one battery of the mobile security unit, wherein disconnecting comprises:
     causing at least one transistor of the circuitry to conduct; and
     opening the at least one switch responsive to the at least one transistor conducting; and
   reconnecting, via the circuitry, the load to the at least one battery after a predetermined time period.

9. The method of claim 8, further comprising receiving a control signal from a device remote from the mobile security unit, wherein generating the pulse signal comprises generating the pulse responsive to receipt of the control signal.

10. The method of claim 8, wherein disconnecting the load comprises opening the at least one switch positioned between the load and the at least one battery.

11. The method of claim 10, wherein opening the at least one switch comprises:
    opening a first switch positioned between the load and a first battery of the at least one battery; and
    opening a second switch positioned between the load and a second battery of the at least one battery.

12. The method of claim 8, wherein the at least one battery includes a primary battery and a backup battery, wherein disconnecting the load comprises disconnecting the load from the primary battery and the backup battery.

13. The method of claim 8, wherein generating the pulse signal comprises generating the pulse signal having a first state, wherein the modem is configured to generate a signal having a second, different state in a normal operating condition.

14. A mobile surveillance unit, comprising:
    at least one power source;
    a load comprising a controller configured to couple to the at least one power source;
    a modem configured to generate a pulse signal, wherein the controller is configured to provide power to the modem; and
    circuitry including at least one relay, the circuitry configured to, responsive to receipt of the pulse signal, disconnect the controller from the at least one power source via the at least one relay, wherein the circuitry comprises:
      a first normally closed relay including a first switch of the at least one relay to disconnect the controller from a first power source of the at least one power source; and
      a second normally closed relay including a second switch of the at least one relay to disconnect the controller from a second power source of the at least one power source.

15. The mobile surveillance unit of claim 14, wherein the at least one power source includes a primary power source and a backup power source.

16. The mobile surveillance unit of claim 15, further comprising:
    a storage box coupled to a trailer and including the primary power source;
    a mast coupled to the trailer and having a first end proximate the storage box; and
    a head unit coupled to a second end of the mast and including the controller, the backup power source, the modem, and the circuitry.

17. The mobile surveillance unit of claim 14, wherein the controller is coupled to at least one of a camera of the mobile surveillance unit, a light of the of the mobile surveillance unit, or a speaker of the mobile surveillance unit.

18. The mobile surveillance unit of claim 14, wherein the modem is configured to generate the pulse signal responsive to the controller malfunctioning.

\* \* \* \* \*